(No Model.)
W. GERBEL.
PROCESS OF MANUFACTURING SPARKLING WINES.
No. 463,421. Patented Nov. 17, 1891.
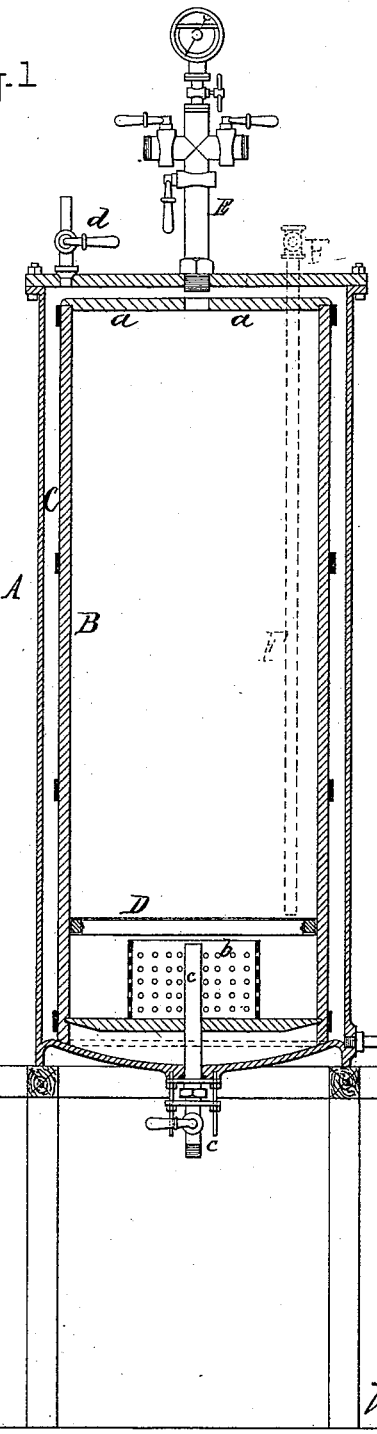
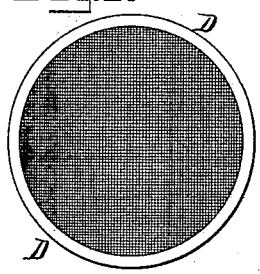
WITNESSES:
George Baumann
John Revell
INVENTOR
Wilhelm Gerbel
BY
Howson and Howson
his ATTORNEYS

UNITED STATES PATENT OFFICE.

WILHELM GERBEL, OF RORSCHACH, SWITZERLAND.

PROCESS OF MANUFACTURING SPARKLING WINES.

SPECIFICATION forming part of Letters Patent No. 463,421, dated November 17, 1891.

Application filed April 24, 1890. Serial No. 349,306. (No specimens.)

*To all whom it may concern:*

Be it known that I, WILHELM GERBEL, a citizen of the Swiss Republic, and a resident of Rorschach, Switzerland, have invented a new and Improved Process of Manufacturing Sparkling Wines, of which the following is a specification.

In the present method of manufacturing sparkling wines in vessels larger than ordinary bottles it is difficult to produce just the right quantity of carbonic acid needed, and it is equally difficult to prevent the ferment from mixing with the sparkling wine. Consequently one cannot use continuously and uninterruptedly ferment introduced into the fermenting-vat for the production of new fermentations, and one cannot obtain with any certainty a sparkling wine possessing a definite content of sugar—that is to say, having at will a given degree of sweetness. There results, therefore, the inconvenient necessity of carefully filtering the wine, which is a delicate and costly operation, and one which is injurious to the taste and bouquet of the wine.

The present invention is designed to overcome these difficulties by a method or process based upon what may be termed "periodical fermentation with separated ferment."

The characteristic features of this method are based upon the following considerations:

First. Fermentation can be carried on more easily and more rapidly in a concentrated solution of sugar than in a weak solution.

Second. If one places upon a vinous solution of sugar in process of fermentation a wine whose fermentation is completed, so that this latter is separated from the sugar solution by a diaphragm which allows the carbonic-acid gas to pass through it, the vinous solution of sugar ferments on its side. During the fermenting the carbonic acid given off is absorbed by the wine already fermented, and the wine, rich in alcohol, coming from the vinous solution of sugar is diffused through the diaphragm and is mixed with the wine above the latter until the sugar is all fermented. After the completion of fermentation there is obtained a wine which contains all the carbonic acid produced from the sugar solution and which is a completely-finished sparkling wine if care has been taken to carry on the fermentation in a closed receiver.

Third. If the finished wine is then drawn off from the fermenting-vat by a special arrangement, so that the germs produced during the fermentation remain in the vat, it will be possible, immediately after this drawing off of the finished wine, to introduce anew into the vat a vinous solution of sugar in contact with the ferment, and then after fermentation has begun to place over it another body of wine, and thus recommence the making of a new quantity of sparkling wine.

The characteristic feature of this process, then, is that the quantity of sugar necessary for the manufacture of a given quantity of sparkling wine is not dissolved in the whole body of the wine, but only in a small part of it, and that, moreover, the ferment necessary for the fermentation is separated by a diaphragm from the wine not in fermentation.

The apparatus for carrying this invention into effect is shown in the accompanying drawings, in which—

Figure 1 is a vertical section of the apparatus, and Fig. 2 is a plan view of the diaphragm.

The part marked A is a strong sheet of iron cylinder of a capacity of from, say, about five hundred to one thousand liters and capable of resisting a pressure of ten atmospheres. In this cylinder there is placed an inner cylinder B, of wood, a space or interval C of about two centimeters being formed around the latter.

The cylinder A is provided with a removable cover capable of being closed air-tight. A double or two-way cock E, connected with a pressure-gage, is screwed into this cover for making a connection with a pressure-producing arrangement or compressor, and the wood cylinder is provided with a cover *a*, which is not air-tight. The annular space C is filled with water under the same pressure as the liquid in the interior of the wood cylinder in order to prevent it from bursting.

In order to maintain as uniform a temperature as possible for the fermentation, the cylinder A may be provided at the lower part with an arrangement for the application of steam or hot water.

The lower part of the wood cylinder B is for the reception of the ferment. In its center there is a perforated glass cylinder of about thirty centimeters diameter and twenty centimeters in height. This cylinder may be covered with flannel.

A discharge-pipe $c$ is passed through the center of the bottom of the two cylinders A and B, being adapted to a stuffing-box with rubber packing in the outer cylinder to make a tight joint while allowing a vertical adjustment of the pipe $c$. The upper end of this pipe may project to about the top of the glass cylinder $b$, which surrounds it. The other end is provided with a tap and is arranged to admit of being connected to a bottling apparatus such as is employed by mineral-water bottlers.

At an elevation of from twenty-five to thirty centimeters above the bottom of the wood cylinder B there is stretched a diaphragm D, of open or permeable fabric, dividing the cylinder into two unequal parts. The lower and smaller part is for the reception of the ferment, which is deposited on the bottom of the wood cylinder B, around the glass cylinder $b$. This movable discharge-pipe $c$, provided with a tap or cock, when introduced to about the level of the top of the glass cylinder enables the finished wine to be drawn off into bottles in a perfectly clear condition and uncontaminated with ferment. By slowly lowering the discharge or racking-off pipe $c$ the wine can be drawn off down to the level of the ferment. The same pipe can be employed for introducing the solution of sugar, as hereinafter described. The cocks $d$ and $e$ are employed for admitting and drawing off the water when required.

The process for the manufacture of sparkling wine according to this invention is conducted in practice as follows: A small portion of the charge of wine to be placed in the wood cylinder B, being prepared for bottling in the usual manner, is taken, and the quantity of sugar required for the formation of the carbonic acid for the whole charge of wine is dissolved in this separated small portion of the entire charge. A sufficient quantity of pure ferment prepared in the known manner is placed on the bottom of the wood cylinder and a portion of the vinous sugar solution at a temperature of about 25° centigrade is introduced, say, through the cock $c$. After a short time fermentation begins, whereupon the remainder of the sugar solution is introduced at the same temperature up to the level of the diaphragm. The operator then waits for a few hours to make sure that the fermentation has begun properly, and when this is the case the remainder of the wine not containing sugar is slowly poured in through a pipe F, extending down to the diaphragm, the wine being carefully run in from above in such a manner as to cause it to spread slowly over the fermenting sugar solution. The fermentation then continues quietly, the wood cylinder B being covered with the wood cover $a$, and the removable cover of the cylinder A being screwed over so as to be air-tight. The slowly-generated carbonic acid now rises up into and is completely absorbed by the wine, so that on the conclusion of the fermentation a wine perfectly uniform in character is obtained. The yeast or ferment accumulating during the fermentation collects at the bottom of the wood cylinder B, as the by-fermentation takes place very slowly. After the pressure-gage indicates the calculated pressure $e$ the fermentation is complete and the finished sparkling wine can be drawn or racked off through the discharge-cock $c$ and bottled by means of a bottling apparatus, the pressure in the wood cylinder B being maintained constant during the bottling by the action of the compressing apparatus connected with the cock E.

It is always advantageous when fermentation is complete to allow the wine to rest for some time before drawing it off into bottles, so that the carbonic acid freshly given off may combine thoroughly with the wine.

The diaphragm D, which is composed of fabric such as ordinarily used for curtains, for instance, is for the purpose of preventing that general mixing together of the two liquids which would otherwise result when the wine is being introduced over the vinous solution of sugar, and it is also for the purpose of retarding the diffusion of the two liquids, so that the fermentation may take place only below the diaphragm.

The ferment preferably used is grape-stalks. The germs of by-fermentation formed during the process adhere firmly to the stalks, so that with care and by racking off slowly the wine may be drawn off quite clear and limpid. On lowering the discharge-pipe when the level of the liquid requires and on continuing the racking off, the ferment in excess will finally flow out with the wine; but this will serve for use in refilling the apparatus with the new solution of sugar.

I claim as my invention—

The method herein described of manufacturing sparkling wines, said method consisting in introducing into a closed vessel a ferment and a portion of the wine mixed with the sugar necessary for the fermentation, then separately introducing over this vinous solution of sugar the remaining body of wine and keeping the two from mixing, so far as possible, while allowing the carbonic-acid gas evolved from the vinous solution of sugar to rise into and be diffused throughout the body of the wine, and finally drawing off the sparkling wine, so as to allow of the reuse of the ferment, all substantially as described.

In testimony whereof I have signed my name to this specification in the presence of two subscribing witnesses.

WILHELM GERBEL.

Witnesses:
 WALTER DUBREULTASCHL,
 TRAUGOTT BRUNNSCHWEILER,
  *Zum Starchen.*